United States Patent
Chen

(10) Patent No.: US 8,982,237 B2
(45) Date of Patent: Mar. 17, 2015

(54) PORTABLE ELECTRONIC DEVICE WITH AUTO-EXPOSURE CONTROL ADAPTIVE TO ENVIRONMENT BRIGHTNESS AND IMAGE CAPTURING METHOD USING THE SAME

(75) Inventor: Wan-Yi Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 2 days.

(21) Appl. No.: 13/316,120

(22) Filed: Dec. 9, 2011

(65) Prior Publication Data

US 2013/0147986 A1 Jun. 13, 2013

(51) Int. Cl.
*H04N 5/228* (2006.01)
*H04N 5/235* (2006.01)
*H04N 5/238* (2006.01)
*G06K 9/00* (2006.01)

(52) U.S. Cl.
USPC ............ 348/229.1; 348/222.1; 348/362; 348/363; 348/364; 382/168; 382/170; 382/171; 382/172

(58) Field of Classification Search
USPC .............. 348/222.1, 229.1, 362–368
See application file for complete search history.

(56) References Cited

U.S. PATENT DOCUMENTS

| | | | | |
|---|---|---|---|---|
| 5,831,676 | A * | 11/1998 | Takahashi et al. | 348/362 |
| 6,741,285 | B2 * | 5/2004 | Takizawa | 348/364 |
| 2007/0216777 | A1 * | 9/2007 | Quan et al. | 348/222.1 |
| 2008/0024616 | A1 * | 1/2008 | Takahashi | 348/221.1 |
| 2009/0003678 | A1 * | 1/2009 | Cutler | 382/132 |
| 2010/0020200 | A1 * | 1/2010 | Fujiwara | 348/234 |
| 2010/0091176 | A1 * | 4/2010 | Cha et al. | 348/365 |
| 2010/0110224 | A1 * | 5/2010 | Kakinuma et al. | 348/223.1 |
| 2010/0182444 | A1 * | 7/2010 | Kroepfl et al. | 348/222.1 |

* cited by examiner

*Primary Examiner* — Timothy J Henn
*Assistant Examiner* — Quan Pham
(74) *Attorney, Agent, or Firm* — Birch, Stewart, Kolasch & Birch, LLP

(57) ABSTRACT

A portable electronic device with camera function and an image capture method with auto exposure control. The disclosed method comprises the following steps: obtaining a pre-view frame from a camera module; dividing the pre-view frame into a plurality of blocks and calculating representative brightness values of the blocks; assigning weight values to the blocks according to the representative brightness values; obtaining a weighted brightness value by performing a weighted operation on the representative brightness values based on the weight values of the blocks; setting an auto exposure parameter of the camera module based on the weighted brightness value; and controlling the camera module for capturing images based on the auto exposure parameter.

14 Claims, 6 Drawing Sheets

PORTABLE ELECTRONIC DEVICE WITH AUTO-EXPOSURE CONTROL ADAPTIVE TO ENVIRONMENT BRIGHTNESS AND IMAGE CAPTURING METHOD USING THE SAME

BACKGROUND OF THE INVENTION

1. Field of the Invention

The present invention relates to a portable electronic device with camera function, and in particular relates to an image capture method with auto exposure control.

2. Description of the Related Art

Auto exposure control is widely used in image capture.

Conventional auto exposure control, however, is incapable of correctly responding to environment brightness. For example, the light reflection from an object which is not at the center of the picture may not be taken into account. Thus, the captured image may be overexposed.

BRIEF SUMMARY OF THE INVENTION

A portable electronic device with camera function and an image capture method with auto exposure control are disclosed.

A portable electronic device in accordance with an exemplary embodiment of the invention comprises a camera module and a controller. The controller comprises a pre-view unit, an auto exposure control unit, and an image capture unit. The pre-view unit may obtain a pre-view frame from the camera module. The auto exposure control unit comprises a block brightness calculation module, a brightness weight assignment module, a weighted brightness calculation module and an exposure parameter setting module. By the block brightness calculation module, the pre-view frame is divided into a plurality of blocks, and, for each block, a representative brightness value is calculated. Based on the representative brightness value of each block, the brightness weight assignment module assigns each block with a respective weight value. The weighted brightness calculation module performs weighted calculation on the representative brightness values according to weight values of the blocks to obtain a weighted brightness value. According to the weighted brightness value, the exposure parameter setting module sets an auto exposure parameter of the camera module. Based on the auto exposure parameter, the image capture unit controls the camera module to capture images.

An image capture method with auto exposure control in accordance with an exemplary embodiment of the invention comprises the steps as follows: obtaining a pre-view frame from a camera module; dividing the pre-view frame into a plurality of blocks and calculating representative brightness values of the blocks; assigning weight values to the blocks according to the representative brightness values; obtaining a weighted brightness value by performing a weighted calculation on the representative brightness values according to weight values of the blocks; setting an auto exposure parameter of the camera module based on the weighted brightness value; and controlling the camera module according to the auto exposure parameters for capturing images.

An image capture method with auto exposure control in accordance with another exemplary embodiment of the invention comprises the steps as follows: obtaining a preview frame from a camera module, wherein the pre-view frame contains a plurality of blocks; analyzing the pre-view frame, assigning a plurality of weight values according to representative brightness values of the blocks, and setting at least one auto exposure parameter of the camera module according to the representative brightness values and the weight values; and controlling the camera module for capturing images based on the at least one auto exposure parameter. The blocks with higher representative brightness values are assigned with higher weight values.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description reveals several exemplary embodiments carrying out the invention. This description is made for the purpose of illustrating the general principles of the invention and should not be taken in a limiting sense. The scope of the invention is best determined by reference to the appended claims.

Figure 1:
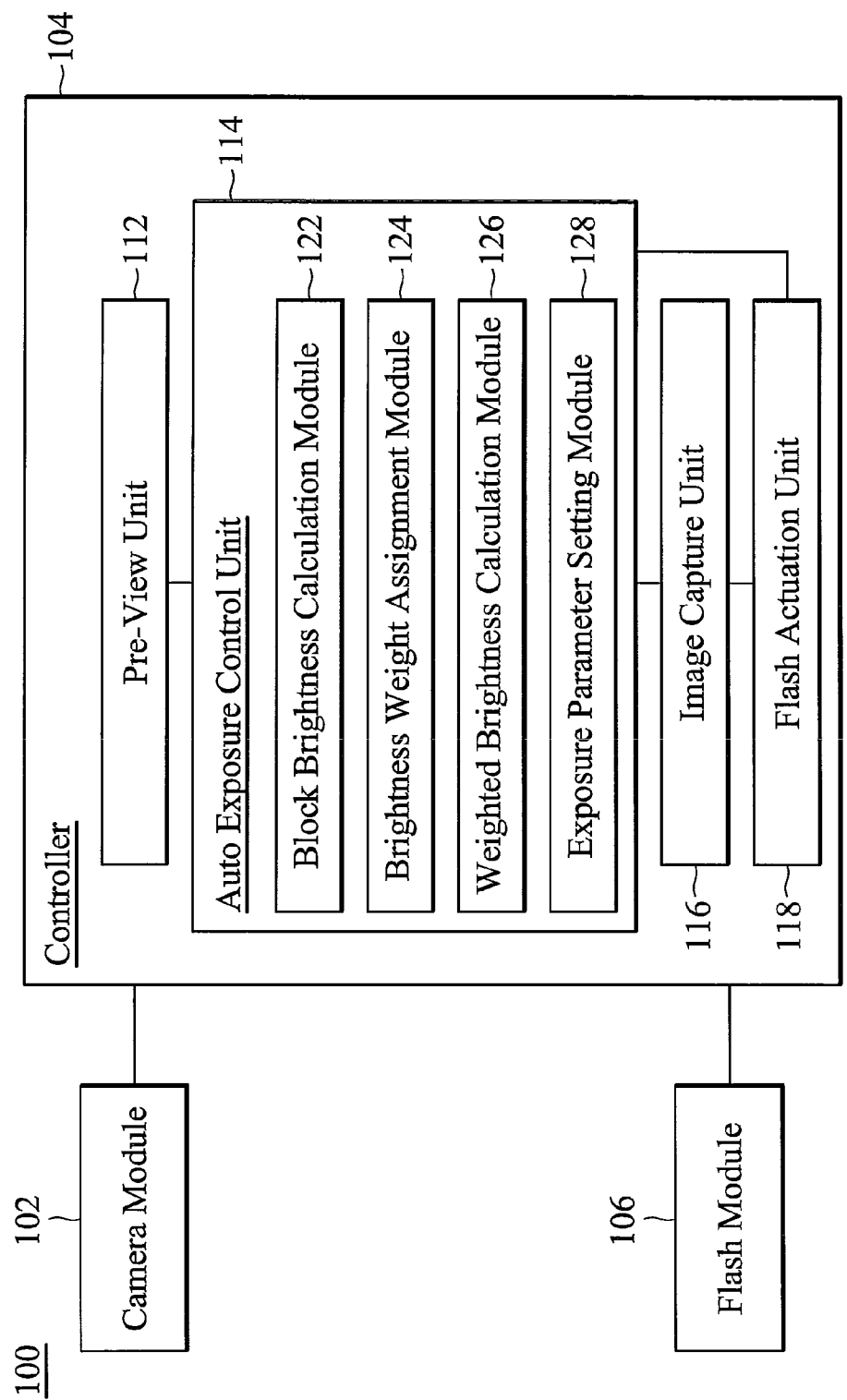
FIG. 1 depicts a portable electronic device 100 with camera function in accordance with an exemplary embodiment of the invention.

FIG. 1 depicts a portable electronic device 100 with camera function in accordance with an exemplary embodiment of the invention.

The portable electronic device 100 comprises a camera module 102, a controller 104 and a flash module 106. The controller comprises a pre-view unit 112, an auto exposure control unit 114, an image capture unit 116 and a flash actuation unit 118. The auto exposure control unit 114 comprises a block brightness calculation module 122, a brightness weight assignment module 124, a weighted brightness calculation module 126 and an exposure parameter setting module 128. The components are discussed in detail below.

First, the pre-view unit 112 may obtain a pre-view frame from the camera module 102. According to the pre-view frame, the auto exposure control unit 114 may perform the steps as follows. First, the block brightness calculation module 122 may divide the pre-view frame into a plurality of blocks, and calculate representative brightness values of the blocks (for example, average luminance (Y) of all pixels within a block.) The brightness weight assignment module 124 assigns each block with a corresponding weight value based on its representative brightness value. According to the weight values of the blocks, the weighted brightness calculation module 126 performs a weighted calculation on the representative brightness values of the blocks to obtain a weighted brightness value. The exposure parameter setting module 128 may set an auto exposure parameter of the camera module 102 according to the weighted brightness value.

The image capture unit 116 may control the camera module 102 for capturing images according to the auto exposure parameter.

Further, in an environment where a flash is needed, the flash actuation unit 118 may actuate the flash module 106 to perform a pre-flash operation—flashing with low intensity—when the pre-view unit 112 is obtaining the pre-view frame from the camera module 102. As the image capture unit 116 instructs the camera module 102 to capture an image, the flash actuation unit 118 controls the flash module 106 to perform a normal flash operation—flashing with high intensity. After the pre-view frame is obtained, the controller 104 may adjust a gain of the flash module 106 based on the light reflection shown in the pre-view frame. Note that when actually capturing an image, the flash module 106 is performing the normal flash operation which is of higher flash intensity than that of pre-flash operation. Therefore, when setting the auto exposure parameter of the camera module 102, the exposure parameter setting module 128 may take the driving current ratio between the normal flash operation and the pre-flash operation into consideration in addition to the weighted brightness value. In this manner, the light reflection caused by flash light (especially the light reflection from an object that is not in the center of the picture) may most probably be dealt with.

In the field of camera exposure control, a common auto exposure parameter comprises an analog gain or/and exposure time. The amount of light passed to the sensor depends on the analog gain, while the exposure interval depends on the exposure time. With the increase of weighted brightness value, the analog gain may be adjusted downward or/and the exposure time may be shorten.

The brightness weight assignment module 124 may classify the blocks into groups based on the representative brightness values of the blocks and assign each group with a weight value based on the brightness distribution among the groups. The brightness weight assignment module 124 may further obtain the relationship between representative brightness values and weight values from a look up table, dynamic calculation or other suitable ways.

In an exemplary embodiment of the invention, the group classification of the blocks is performed by evenly dividing the blocks into groups according to the representative brightness value. For example, the blocks are graded from 0% to 100% and divided into groups based on representative brightness value. For the blocks with representative brightness value of top 25%, 76-100%, the blocks are classified to a first group and correspond to a weight value W1. For blocks with representative brightness value fall within 51-75%, the blocks are classified to a second group and correspond to a weight value W2. For the blocks with representative brightness value fall within 26-50%, the blocks are classified to a third group and correspond to a weight value W3. As to the remaining blocks having representative brightness values fall within 0-25%, these blocks are classified to a fourth group and correspond to a weight value W4. In another exemplary embodiment, the brightness value of the 75% is set as a first brightness threshold value, the representative brightness value of the 50% is set as a second brightness threshold value, and the representative brightness value of 25% is set as a third brightness threshold value. For blocks having representative brightness values greater than the first brightness threshold value, corresponding weight value is W1. For blocks having representative brightness values greater than the second brightness value and smaller or equal to the first brightness threshold value, corresponding weight value is W2. For blocks having representative brightness values greater than the third brightness value and smaller or equal to the second brightness value, corresponding weight value is W3. For blocks having representative brightness values smaller or equal to the third brightness threshold value, corresponding weight value is W4.

The setting of brightness threshold values may depend on the actual situations or needs. For example, a portrait photo and a night-scene photo may require different settings in brightness threshold values. The default of the brightness thresholds may be stored in the portable electronic device, or, the brightness thresholds may be configured by the user.

In another exemplary embodiment of the invention, the brightness weight is assigned based on statistical analysis. When applying statistical analysis, the brightness weight assignment may comprise the following steps: calculating the number of blocks with respect to different representative brightness values; setting a plurality of brightness threshold values based on the result of previous calculation, and assigning corresponding weight values to the plurality of brightness threshold values; and comparing the representative brightness values of the blocks with the brightness threshold values and assigning corresponding weight values to each of the blocks according to the result of previous comparison.

The aforementioned units and modules may be implemented by hardware as well as be implemented by software which is executed by a processor, or, may be implemented by any combination of software, hardware, firmware in some exemplary embodiments.

Figure 2:
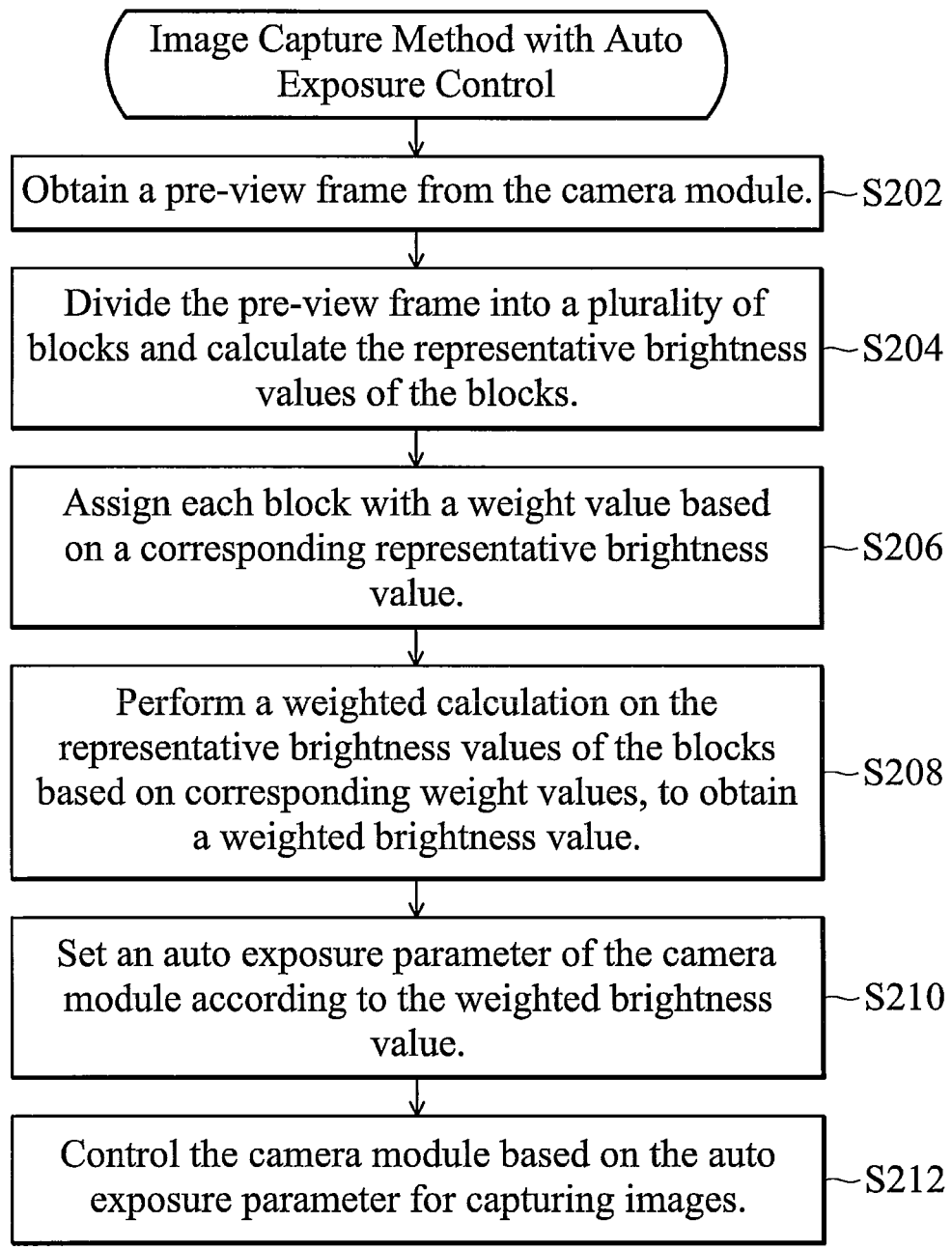
FIG. 2 is flowchart depicting an image capture method with auto exposure control in accordance with an exemplary embodiment of the invention.

FIG. 2 is a flowchart depicting an image capture method with auto exposure control in accordance with an exemplary embodiment of the invention. In step S202, a pre-view frame is obtained from the camera module. In step S204, the pre-view frame is divided into a plurality of blocks and the representative brightness values of the blocks are calculated. In step S206, each block is assigned with a weight value based on corresponding representative brightness value. In step S208, a weighted calculation is performed on the representative brightness values of the blocks based on corresponding weight values, to obtain a weighted brightness value. In step S210, an auto exposure parameter of the camera module is set according to the weighted brightness value. In step S212, the camera module is controlled based on the auto exposure parameter for capturing images.

In an exemplary embodiment of the invention, the image capture method further comprises performing a pre-flash operation by the flash module in step S202, and performing a normal flash operation by the flash module in step S212. The flash light intensity is larger in the normal flash operation than the pre-flash operation. In this exemplary embodiment, in addition to the weighted brightness value, the auto exposure parameter is set according to the ratio of driving currents between the normal flash operation and the pre-flash operation as well in step 5210.

Figure 3:
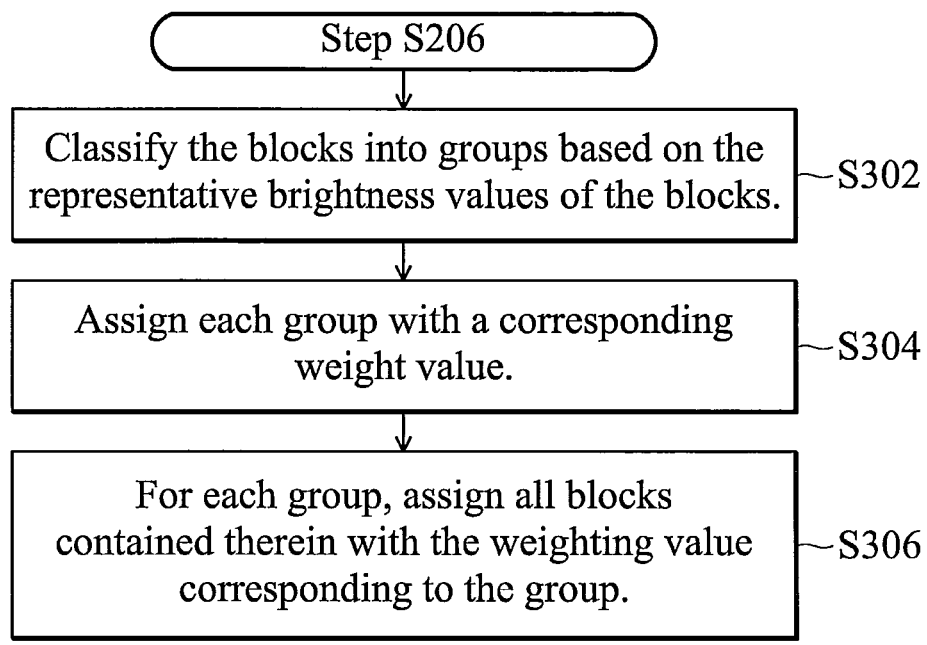
FIG. 3 is a flowchart showing an exemplary embodiment of step S206.

FIG. 3 is a flowchart depicting the processes of step S206 in detail in accordance with an exemplary embodiment of the invention, which includes steps S302-S306. In step 5302, the blocks are classified into groups based on the representative brightness values of the blocks. In step S304, each group is assigned with a corresponding weight value. In step S306, corresponding weight values are assigned to each block within each group. For step 5302, the groups may be classified by various embodiments. For example, the groups may be classified by evenly dividing the blocks according to the distribution of representative brightness values, or based on pre-determined brightness threshold values, or based on brightness threshold values obtained by statistical analysis.

Figure 4:
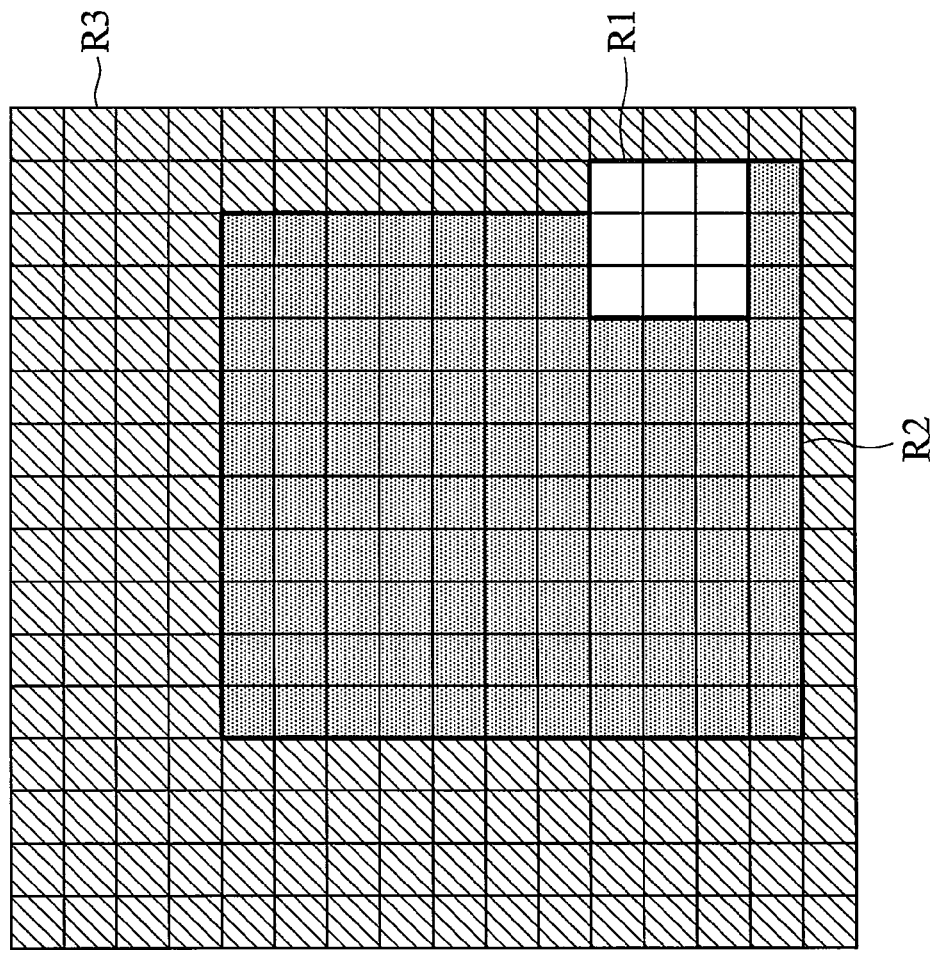
FIG. 4 shows a pre-view frame 400.
Figure 5:
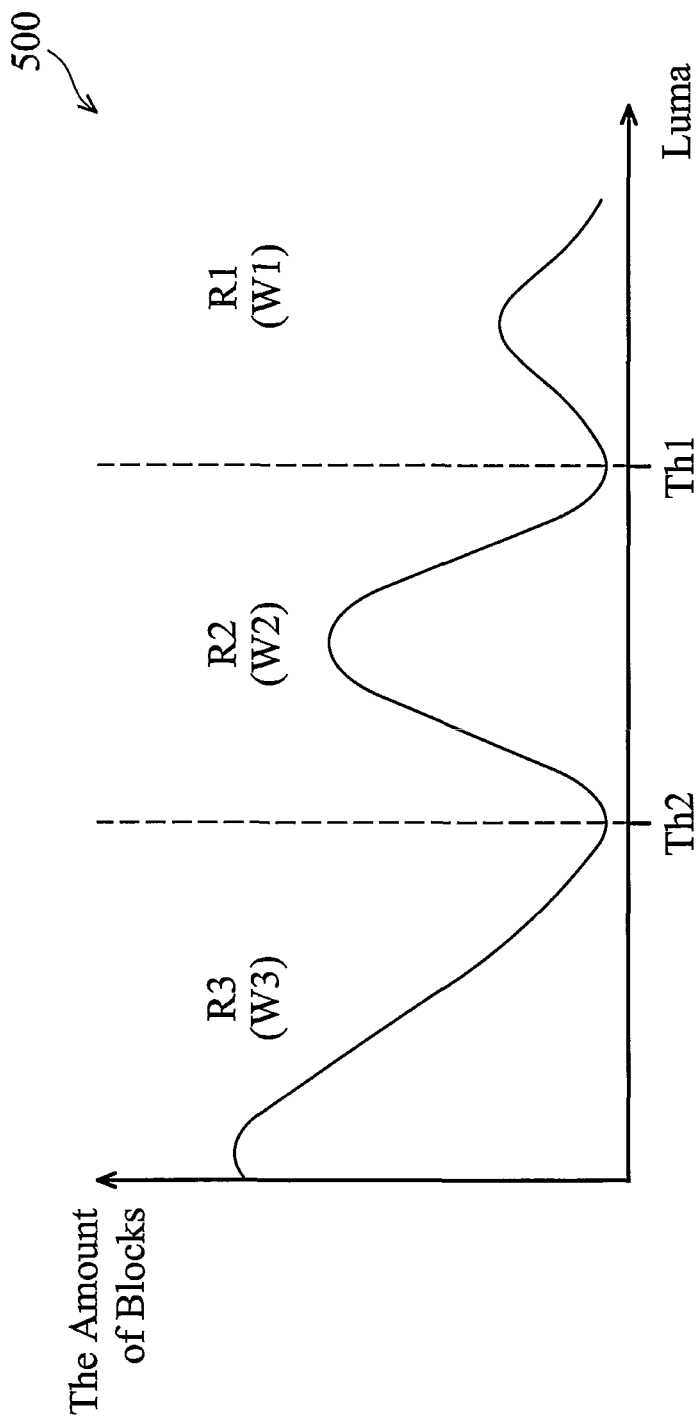
FIG. 5 depicts the disclosed group classification in accordance with an exemplary embodiment of the invention, which is based on statistics.

FIG. 4 and FIG. 5 show an exemplary embodiment of classifying groups by setting brightness threshold values by statistical analysis.

FIG. 4 illustrates a pre-view frame 400. In this exemplary embodiment, the pre-view frame 400 is divided into 16×16 blocks. Region R1 comprises blocks of higher brightness, region R2 is of medium brightness and region R3 is of lower brightness. The classification result of step S302 may result in the diagram 500 of FIG. 5, in which the horizontal axis represents brightness (Luma) value and the vertical axis represents the number of blocks. Referring to the diagram 500, threshold values can be chosen by the brightness values having fewer number of blocks, say Th1 and Th2. The blocks with representative brightness value greater than the brightness threshold value Th1 is set to be of weight value W1. The blocks with representative brightness value between the brightness threshold values Th2 and Th1 is set to be of weight value W2. The weight value of blocks with representative value lower than the brightness threshold value Th2 correspond to W3. The weight value W1 is greater than the weight value W2, and the weight value W2 is greater than the weight value W3. In this exemplary embodiment, three levels of weight value W1, W2 and W3 are provided. That is: blocks within region R1 have the weight value W1; blocks within region R2 have the weight value W2; and block within region R3 have the weight value W3.

The weighted brightness value Bw may be obtained by the following formula:

$$Bw = \frac{\sum_{i \in R1} Bi \cdot W1 + \sum_{j \in R2} Bj \cdot W2 + \sum_{k \in R3} Bk \cdot W3}{16 \times 16},$$

where Bi, Bj, Bk are representative brightness values of the blocks (for example, an average of Y values (Luma) of all pixels of a block represents the representative brightness value of the block.) The weighted brightness value Bw may be taken into consideration in the setting of the auto exposure parameter, such as analog gain or/and exposure time. With the increase of the weighted brightness value Bw, the analog gain may be adjusted downward or/and the exposure time may be shorten accordingly.

Figure 6:
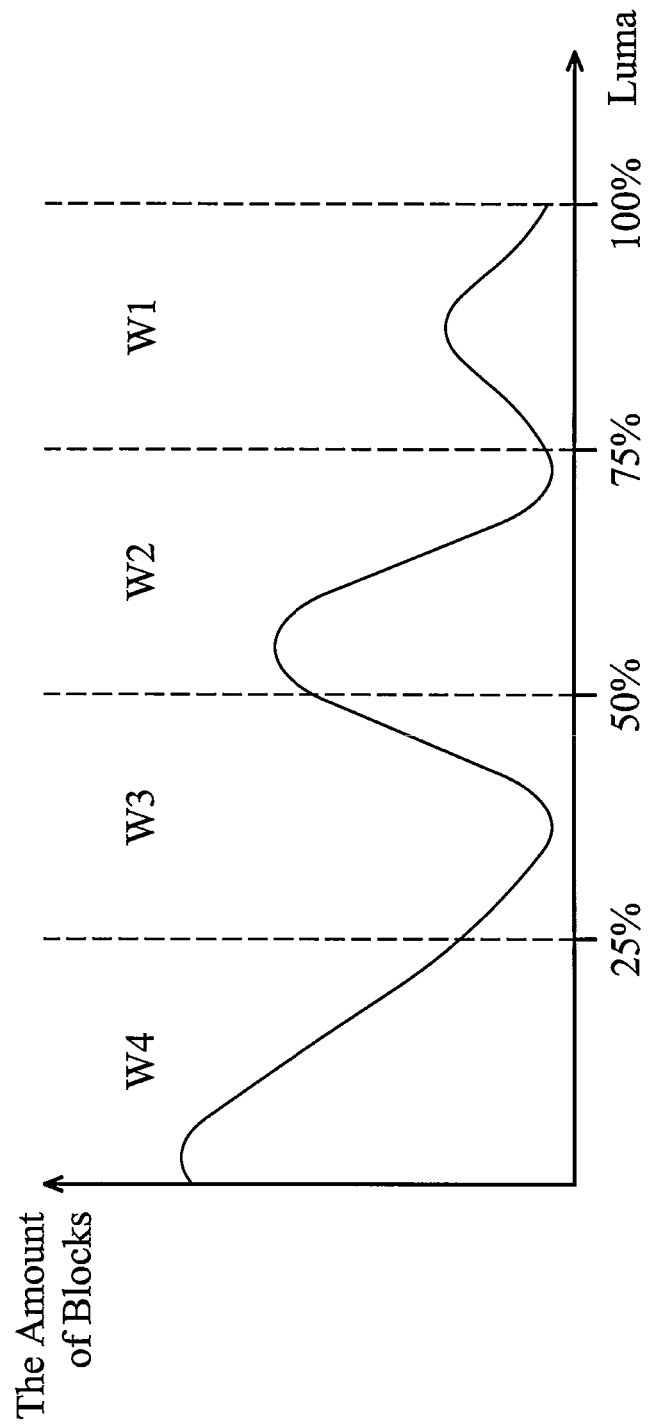
FIG. 6 depicts the disclosed group classification in accordance with an exemplary embodiment of the invention, which is based on the distribution of the representative brightness values.

FIG. 6 shows another exemplary embodiment of classifying groups, wherein the relationship between the brightness value and number of blocks is the same as that of FIG. 5. In this embodiment groups are classified by evenly dividing the blocks into groups according to the brightness threshold values. As shown by FIG. 6, blocks having representative brightness values belonging to the top 25% (76% to 100%) are classified to a first group, whose corresponding weight value is set to W1. Blocks having representative brightness values within 51% to 75% are classified to a second group, whose corresponding weight value is W2. Blocks having representative brightness values within 26% to 50% are classified to a third group, whose corresponding weight value is W3. Blocks having representative brightness values within 0% to 25% are classified to a forth group, whose corresponding weight value is W4. The weight values from large to small: W1, W2, W3 to W4. The weight values can be predefined or obtained by lookup table.

By the disclosed techniques, the environment brightness may be taken into account in auto exposure control to prevent overexposure. In particular, for an object that reflects light and is not in the center of the picture, the light reflection is taken into consideration by the disclosed techniques when capturing an image.

It is not intended to limit the scope of the disclosure by the aforementioned exemplary embodiments. Any techniques by which a pre-view frame is analyzed and the brightness information of the brighter blocks is assigned with a higher weighting value for setting an auto exposure parameter of a camera are regarded within the scope of the disclosure.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device with camera function, comprising:
    a camera module; and
    a processor for executing software, the software comprising:
        a pre-view unit, configured to obtain a pre-view frame from the camera module;
        an auto exposure control unit, comprising:
            a block brightness calculation module, configured to divide the pre-view frame into a plurality of blocks and calculate representative brightness values of the plurality of blocks, wherein a representative brightness value of a block is represented by an average of luminance values of all pixels of the block;
            a brightness weight assignment module, configured to assign weight values to the plurality of blocks according to the representative brightness values, the weight values comprising a first weight value, a second weight value and a third weight value, the first weight value being larger than the second weight value, and the second weight value being larger than the third weight value, so as to emphasize the blocks of higher representative brightness values;
            a weighted brightness calculation module, configured to obtain a weighted brightness value by performing a weighted calculation on the representative brightness values of the blocks according to the weight values of the blocks; and
            an exposure parameter setting module, configured to set at least one auto exposure parameter of the camera module based on the weighted brightness value; and
        an image capture unit, configured to control the camera module for capturing images based on the at least one auto exposure parameter, wherein the brightness weight assignment module is configured to:
            set a plurality of brightness threshold values according to a statistical analysis on the representative brightness values of the blocks, and set a plurality of weight values according to the brightness threshold values;
            compare the representative brightness values of the plurality of blocks with the brightness threshold values and assign corresponding weight values to the plurality of blocks.

2. The portable electronic device with camera function as claimed in claim 1, further comprising:
    a flash module; and
    the software further comprising: a flash actuation unit, wherein the flash actuation unit actuates the flash module to perform a pre-flash operation for the camera module to obtain the pre-view frame, and actuates the flash module to perform a normal flash operation for the camera module to capture images, and the pre-flash operation generates a lower intensity flash than the normal flash operation.

3. The portable electronic device with camera function as claimed in claim 2, wherein the exposure parameter setting module further sets the at least one auto exposure parameter of the camera module based on a driving current ratio between the pre-flash operation and normal flash operation.

4. The portable electronic device with camera function as claimed in claim 1, wherein the at least one auto exposure parameter comprises analog gain or/and exposure time.

5. The portable electronic device with camera function as claimed in claim 1, wherein the brightness weight assignment module is further configured to:
    calculate block numbers with respect to different representative brightness values; and
    set the plurality of brightness threshold values according to the calculation result about the block numbers with respect to the different representative brightness values.

6. An image capture method with auto exposure control, comprising:
    obtaining a pre-view frame from a camera module;
    dividing the pre-view frame into a plurality of blocks and calculating representative brightness values of the blocks, wherein a representative brightness value of a block is represented by an average of luminance values of all pixels of the block;
    assigning weight values to the blocks according to the representative brightness values, the weight values comprising a first weight value, a second weight value and a third weight value, the first weight value being larger than the second weight value, and the second weight value being larger than the third weight value, so as to emphasize the blocks of higher representative brightness values;
    obtaining a weighted brightness value by performing a weighted calculation on the representative brightness values based on the weight values of the blocks;
    setting at least one auto exposure parameter of the camera module based on the weighted brightness value; and
    controlling the camera module to capture images according to the at least one auto exposure parameter,
    wherein the step of assigning weight values to the blocks according to the representative brightness values comprises:
    setting a plurality of brightness threshold values according to a statistical analysis result of the representative brightness values of the blocks and setting a plurality of weight values according the brightness threshold values; and
    comparing the representative brightness values of the blocks with the brightness threshold values and assigning corresponding weight values to the blocks according to the comparison result.

7. The image capture method with auto exposure control as claimed in claim 6, further comprising:
    performing a pre-flash operation by a flash module for obtaining the pre-view frame from the camera module; and
    performing a normal flash operation for capturing images by the camera module, wherein intensity of flash is larger in the normal flash operation than in the pre-flash operation.

8. The image capture method with auto exposure control as claimed in claim 7, further comprising:
    setting the at least one auto exposure parameter of the camera module according to a ratio of driving current between the normal flash operation and the pre-flash operation.

9. The image capture method with auto exposure control as claimed in claim 6, wherein the at least one auto exposure parameter comprises analog gain or/and exposure time.

10. The image capture method with auto exposure control as claimed in claim 6, wherein the step of assigning weight values to the blocks according to the representative brightness values further comprises:
    performing a statistical analysis on the representative brightness values of the blocks to calculate block numbers with respect to different representative brightness values; and
    setting the plurality of brightness threshold values according to the statistical analysis result and setting a plurality of weight values according the brightness threshold values.

11. An image capture method with auto exposure control, comprising:
    obtaining a pre-view frame from a camera module, wherein the pre-view frame contains a plurality of blocks;
    analyzing the pre-view frame and thereby assigning a plurality of weight values according to representative brightness values of the blocks and setting at least one auto exposure parameter of the camera module according to the representative brightness values and the weight values, wherein a representative brightness value of a block is represented by an average of luminance values of all pixels of the block, the weight values comprises a first weight value, a second weight value and a third weight value, the first weight value is larger than the second weight value, and the second weight value is larger than the third weight value, so as to emphasize the blocks of higher representative brightness values; and
    controlling the camera module for capturing images based on the at least one auto exposure control parameter,
    wherein the blocks with higher representative brightness values are assigned with higher weight values, and
    wherein the step of assigning weight values to the blocks according to the representative brightness values comprises:
    setting a plurality of brightness threshold values according to a statistical analysis result of the representative brightness values of the blocks and setting a plurality of weight values according the brightness threshold values; and
    comparing the representative brightness values of the blocks with the brightness threshold values and assigning corresponding weight values to the blocks according to the comparison result.

12. The image capture method with auto exposure control as claimed in claim 11, further comprising:
    performing a pre-flash operation by a flash module for obtaining the pre-view frame; and
    performing a normal flash operation by the flash module for capturing images;
    wherein intensity of flash is higher in the normal flash operation than in pre-flash operation.

13. The image capture method with auto exposure control as claimed in claim 12, further comprising:
    setting the at least one auto exposure parameter according to a driving current ratio between the normal flash operation and the pre-flash operation.

14. The image capture method with auto exposure control as claimed in claim 11, wherein the at least one auto exposure parameter comprises an analog gain or/and exposure time.

\* \* \* \* \*